United States Patent
Kim

(10) Patent No.: US 9,042,465 B2
(45) Date of Patent: May 26, 2015

(54) METHOD AND APPARATUS FOR UPDATING CHANNEL INFORMATION IN MOBILE COMMUNICATION TERMINAL

(75) Inventor: Dong-Hyeon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 13/070,943

(22) Filed: Mar. 24, 2011

(65) Prior Publication Data

US 2011/0235726 A1      Sep. 29, 2011

(30) Foreign Application Priority Data

Mar. 29, 2010    (KR) ..................... 10-2010-0027724

(51) Int. Cl.
*H04L 27/00*    (2006.01)
*H04L 5/00*     (2006.01)

(52) U.S. Cl.
CPC ............ *H04L 5/0085* (2013.01); *H04L 5/0096* (2013.01)

(58) Field of Classification Search
CPC .. H04L 12/18; H04L 12/189; H04N 21/4383; H04N 21/4345; H04W 72/005; H04W 88/02; H04H 60/91; H04H 60/43; H04H 60/51; H04H 60/65; H04H 20/72; H04M 1/72572; H04M 3/42348
USPC .......... 375/219, 259–260; 370/319–320, 338, 370/342; 455/418, 436, 456.1, 432.1, 455/456.3, 517
See application file for complete search history.

(56) References Cited

U.S. PATENT DOCUMENTS

| | | | | |
|---|---|---|---|---|
| 5,987,332 | A * | 11/1999 | Gettleman et al. | 455/518 |
| 6,032,042 | A * | 2/2000 | Kauppi | 455/432.3 |
| 6,163,683 | A * | 12/2000 | Dunn et al. | 455/151.1 |
| 6,230,018 | B1 * | 5/2001 | Watters et al. | 455/456.3 |
| 6,549,770 | B1 * | 4/2003 | Marran | 455/419 |
| 6,577,614 | B1 * | 6/2003 | Cook et al. | 370/338 |
| 7,519,358 | B2 * | 4/2009 | Benco et al. | 455/418 |
| 7,583,929 | B2 * | 9/2009 | Choi et al. | 455/3.01 |
| 7,643,833 | B2 * | 1/2010 | Sankisa | 455/456.1 |
| 2003/0003909 | A1 * | 1/2003 | Keronen et al. | 455/434 |
| 2004/0203693 | A1 * | 10/2004 | Mehta et al. | 455/419 |
| 2006/0111109 | A1 * | 5/2006 | Kim | 455/436 |
| 2007/0136203 | A1 * | 6/2007 | Guahk et al. | 705/51 |
| 2007/0155308 | A1 * | 7/2007 | An | 455/3.02 |
| 2009/0143067 | A1 * | 6/2009 | Kim et al. | 455/434 |
| 2009/0190534 | A1 * | 7/2009 | Yamada et al. | 370/328 |
| 2009/0204996 | A1 * | 8/2009 | Kim et al. | 725/54 |
| 2009/0293094 | A1 * | 11/2009 | Choi et al. | 725/115 |

OTHER PUBLICATIONS

Tu Me-Dia Corp., Inquiring System for Alteration Result of Subscriber Information in Digital Multimedia Broadcasting Service Using OTA Wireless Communication Network, Jul. 10, 2008, International Publication No. WO 2008/082183 A1.*

* cited by examiner

*Primary Examiner* — Khanh C Tran
(74) *Attorney, Agent, or Firm* — Jefferson IP Law, LLP

(57) ABSTRACT

An apparatus and method for updating channel information in a mobile communication terminal supporting Digital Multimedia Broadcasting (DMB) are provided. The method includes sending a broadcasting information request to an Over The Air (OTA) server over a mobile communication network, receiving broadcasting information from the OTA server over the mobile communication network, and updating stored broadcasting information based on the received broadcasting information.

12 Claims, 4 Drawing Sheets

METHOD AND APPARATUS FOR UPDATING CHANNEL INFORMATION IN MOBILE COMMUNICATION TERMINAL

PRIORITY

This application claims the benefit under 35 U.S.C. §119 (a) of a Korean patent application filed in the Korean Intellectual Property Office on Mar. 29, 2010, and assigned Serial No. 10-2010-0027724, the entire disclosure of which is hereby incorporated by reference.

BACKGROUND OF THE INVENTION

1. Field of the Invention

The present invention relates to an apparatus and method for updating channel information in a mobile communication terminal. More particularly, the present invention relates to an apparatus and method for updating channel information over a mobile communication network, rather than over a Digital Multimedia Broadcasting (DMB) network, in a mobile communication terminal which supports DMB reception.

2. Description of the Related Art

Digital Multimedia Broadcasting (DMB) is a broadcasting service provided by digitizing various multimedia signals such as audio and video. In particular, the DMB allows a user on the move to receive various multimedia broadcasts using a personal portable receiver or a vehicular receiver including a non-directional reception antenna.

As a conventional mounting technique of a memory for storing mass digital multimedia (e.g., moving pictures and music videos) advances and mobile communication terminals are used, mobile communication terminals capable of receiving the DMB have been developed and commercialized. Hence, users may view the DMB using a mobile communication terminal which supports the DMB reception while moving. That is, the mobile communication terminal supporting the DMB reception, which is portable and mobile, allows the DMB viewing regardless of the time and place of a user carrying the mobile communication terminal.

The DMB is classified to one of a terrestrial DMB and a satellite DMB, according to the data transmission means. The terrestrial DMB transmits the broadcast to the DMB reception terminal via a base station of a terrestrial broadcasting station (e.g., Munhwa Broadcasting Corporation (MBC), Korean Broadcasting System (KBS), Seoul Broadcasting System (SBS), Educational Broadcasting System (EBS), etc.), and uses frequencies corresponding to 174~216 MHz. In the satellite DMB, when a broadcasting provider transmits the broadcast signal to a satellite, the satellite receives and retransmits the broadcast signal to the DMB reception terminal. A separate repeater may be installed in a weak signal 'shadow' area, for example, in a subway or between tall buildings, where it is hard to receive the broadcast signal directly from the satellite. Currently, the satellite DMB uses frequencies of 2,605~2,655 MHz.

The DMB provides regional broadcasting using different frequencies per region, rather than providing nationwide broadcasting using a single frequency all over the nation. Accordingly, when a DMB user travels into a new service region, he/she needs to update information (i.e., the center frequency information of the channel) relating to the corresponding regional broadcasting channel to receive the broadcast in the new service region. To do so, the DMB user needs to search for available nearby frequencies using a channel scan function of the terminal, and thus may select his/her intended channel from the searched frequency list. However, when the searched frequency list does not include the frequency corresponding to the intended channel because the nearby signal at the corresponding location is too weak and all the center frequencies for the channels serviced in the corresponding region are not scanned, the DMB user must continue scanning the available nearby frequencies using the channel search function in order to search for his/her intended channel. In result, considerable time is taken to scan the channels.

SUMMARY OF THE INVENTION

Aspects of the present invention are to address at least the above-mentioned problems and/or disadvantages and to provide at least the advantages described below. Accordingly, an aspect of the present invention is to provide an apparatus and method for updating channel information in a mobile communication terminal.

Another aspect of the present invention is to provide an apparatus and method for updating channel information over a mobile communication network, rather than over a Digital Multimedia Broadcasting (DMB) network, in a mobile communication terminal which supports DMB reception.

Yet another aspect of the present invention is to provide an apparatus and method for updating pre-stored channel information by sending a channel information request to an Over The Air (OTA) server according to an OTA wireless protocol and receiving the channel information in a mobile communication terminal which supports DMB reception.

Still another aspect of the present invention is to provide an apparatus and method for updating pre-stored channel information by receiving the channel information broadcast by a base station in a corresponding weak signal 'shadow' area when a mobile communication terminal supporting DMB reception enters the shadow area.

According to one aspect of the present invention, a method for updating broadcasting information in a mobile communication terminal which supports DMB reception is provided. The method includes sending a broadcasting information request to an OTA server over a mobile communication network, receiving broadcasting information from the OTA server over the mobile communication network, and updating pre-stored broadcasting information based on the received broadcasting information.

According to another aspect of the present invention, a method for updating broadcasting information in a mobile communication terminal which supports DMB reception is provided. The method includes entering a certain region, receiving information broadcast by a base station in the region, and, when the received broadcast information includes broadcasting information, updating stored broadcasting information based on the received broadcasting information.

According to yet another aspect of the present invention, an apparatus for updating broadcasting information in a mobile communication terminal which supports DMB reception is provided. The apparatus includes a wireless communication unit for sending a broadcasting information request to an OTA server over a mobile communication network and for receiving the broadcasting information from the OTA server over the mobile communication network, and a storage unit for updating stored broadcasting information based on the received broadcasting information.

According to still another aspect of the present invention, an apparatus for updating broadcasting information in a mobile communication terminal supporting DMB reception is provided. The apparatus includes a wireless communication unit for, when detecting entry to a certain region, receiving information broadcast by a base station in the region, and a storage unit for, when the received broadcast information includes broadcasting information, updating stored broadcasting information based on the received broadcasting information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
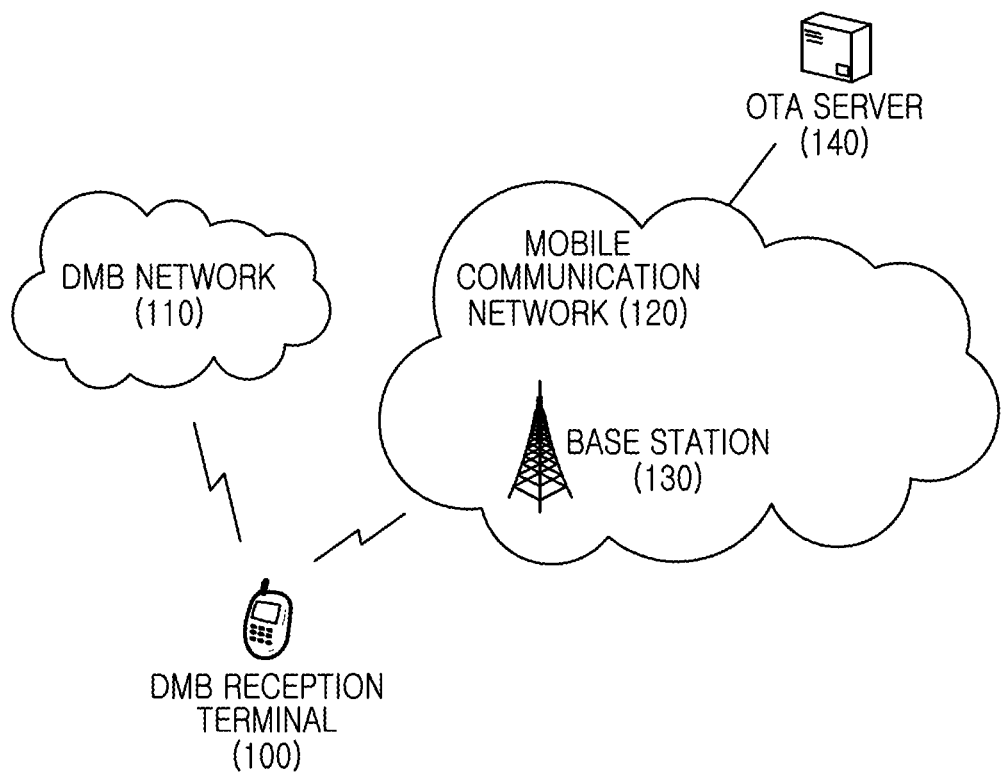
FIG. 1 illustrates a mobile communication system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the exemplary embodiments described herein may be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for updating channel information over a mobile communication network, rather than over a Digital Multimedia Broadcasting (DMB) network, in a mobile communication terminal which supports DMB reception. Hereinafter, the mobile communication terminal supporting the DMB reception is referred to as a DMB reception terminal.

In particular, according to one exemplary embodiment, the DMB reception terminal sends a channel information request to an Over The Air (OTA) server using an OTA wireless protocol, receives the channel information, and updates stored channel information with the received channel information. According to another exemplary embodiment, when the DMB reception terminal enters a specific region (e.g., a weak signal 'shadow' area), it updates the stored channel information by receiving channel information broadcast by a base station in the corresponding region. Herein, the OTA is the most common wireless communication service for sending information requested by a user of the mobile communication terminal. That is, when the user sends the information request to the OTA server, the OTA server transmits the requested information to the mobile communication terminal.

In the following, while the channel information (i.e., the center frequency information of the channel) is exemplified, it is noted that the present invention is also applicable to every broadcasting information (e.g., broadcast program information) relating to the DMB broadcasting.

FIG. 1 depicts a mobile communication system according to an exemplary embodiment of the present invention.

Referring to FIG. 1, the mobile communication system includes a DMB reception terminal 100, a DMB network 110, a mobile communication network 120, and an OTA server 140. The mobile communication network 120 includes a base station 130.

The DMB network 110 provides a DMB service to the DMB reception terminal 100, and broadcasts a broadcast program from a DMB content server (not shown) to the DMB reception terminal 100.

The mobile communication network 120, which enables mobility of the DMB reception terminal 100, manages handoff and radio resources. The mobile communication network 120 may be implemented, for example, by a Code Division Multiple Access (CDMA), Wideband Code Division Multiple Access (WCDMA), Wireless Broadband Internet (WiBro), High Speed Downlink Packet Access (HSDPA), wireless mobile Internet, Internet Protocol (IP) Multimedia Subsystem (IMS), or Wireless Local Area Network (WLAN) communication network.

The base station 130 in the mobile communication network 120 manages the mobility of the DMB reception terminal 100, communicates with the OTA server 140 by cable, wirelessly communicates with the DMB reception terminal 100, and delivers signals between the DMB reception terminal 100 and the OTA server 140. In another exemplary embodiment, the base station 130 may broadcast channel information to the DMB reception terminal 100 which enters its coverage.

In one exemplary embodiment, the OTA server 140 may store and manage channel information corresponding to the location using a database, and may search and provide the channel information of the corresponding DMB reception terminal 100 in the database according to a request of the DMB reception terminal 100. Herein, the OTA server 140 may obtain location information of the DMB reception terminal 100 from a location server (not shown), and may provide channel information mapped to the corresponding location to the DMB reception terminal 100 over the mobile communication network.

The DMB reception terminal 100 performs mobile communication via the mobile communication network 120 and receives the DMB service over the DMB network 110. In addition to those typical functions, the DMB reception terminal 100 updates the stored channel information over the mobile communication network 120, rather than the DMB network 110. In one exemplary embodiment, the DMB reception terminal 100 sends the channel information request to the OTA server 140 over the mobile communication network 120 using the OTA wireless protocol, and updates the stored channel information by receiving the channel information from the OTA server 140. In another exemplary embodiment, when the DMB reception terminal 100 enters a specific region (e.g., the shadow area), it updates the stored channel information by receiving the channel information broadcast by the base station 130 in the corresponding region.

Figure 2:
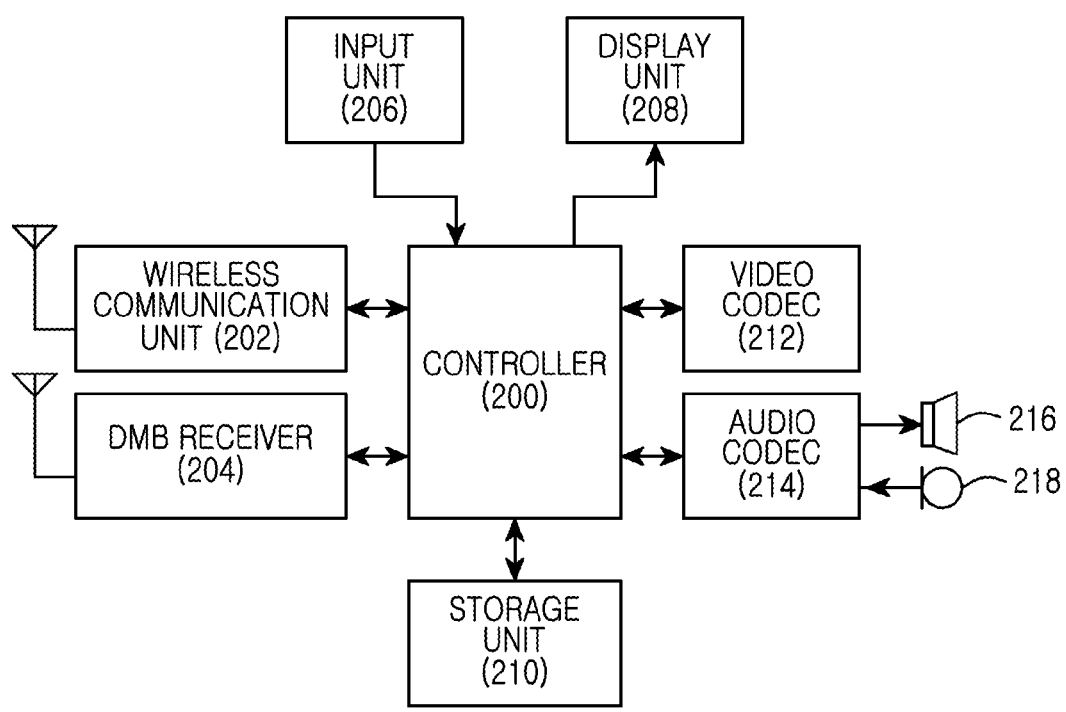
FIG. 2 illustrates a structure of a Digital Multimedia Broadcasting (DMB) reception terminal according to an exemplary embodiment of the present invention.

FIG. 2 depicts a structure of the DMB reception terminal according to an exemplary embodiment of the present invention.

Referring to FIG. 2, the DMB reception terminal includes a controller 200, a wireless communication unit 202, a DMB receiver 204, an input unit 206, a display unit 208, a storage unit 210, a video codec 212, an audio codec 214, a speaker 216, and a microphone 218.

The controller 200 controls and processes operations of the DMB reception terminal. More particularly, the controller 200 processes to update the channel information over the mobile communication network, rather than over the DMB network. In one exemplary embodiment, the controller 200 processes to request and receive the channel information to and from the OTA server using the OTA wireless protocol, and to update channel information stored in the storage unit 210. In another exemplary embodiment, when the terminal enters a particular region (e.g., a shadow area), the controller 200 functions to receive the channel information broadcast by the base station in the corresponding region and to update the channel information stored in the storage unit 210.

The wireless communication unit 202 down-converts and demodulates a radio signal received from a base station in the mobile communication network via an antenna, and provides the signal to the controller 200. The wireless communication unit 202 up-converts and modulates a baseband signal from the controller 200 to a radio signal and transmits the radio signal to the base station via the antenna.

Under the control of the controller 200, the DMB receiver 204 extracts a DMB signal of the center frequency corresponding to a channel input by a user through an input unit 206, from the DMB signal received via a DMB antenna over the DMB network, decodes the extracted DMB signal, and outputs the decoded DMB signal to the controller 200. Herein, the controller 200 receives the decoded DMB signal from the DMB receiver 208, provides video data of the decoded DMB signal to the video codec 212, and provides audio data of the decoded DMB signal to the audio codec 214.

The exemplary input unit 206 includes a plurality of number keys and function keys, and outputs key input data corresponding to the key pressed by the user, to the controller 200.

The display unit 208 displays status information, a limited number of characters, moving pictures, and still images generating in the operation of the DMB reception terminal. The display unit 208 may employ a color Liquid Crystal Display (LCD).

The storage unit 210 contains microcodes and reference data of a program for processing and controlling the controller 200, and stores temporary data generated in program execution. In particular, the storage unit 210 contains a program for controlling the DMB reception terminal to update channel information over the mobile communication network, rather than over the DMB network. Also, the storage unit 210 stores and manages the channel information.

The video codec 212 decodes the video data fed from the controller 200, and outputs the decoded video data to the outside through the display unit 208 via the controller 200.

The audio codec 214 converts the digital audio data fed from the controller 200 to an analog audio signal and outputs the analog audio signal through the speaker 216. The audio codec 214 converts the analog audio signal received through the microphone 218 to digital audio data and provides the digital audio data to the controller 200.

The DMB reception terminal may include a Global Positioning System (GPS) receiver, which is not depicted here. The DMB reception terminal may receive GPS data from a GPS satellite using the GPS receiver, obtain location information based on the received GPS data, and send a channel information request corresponding to the obtained location information to the OTA server.

Figure 3:
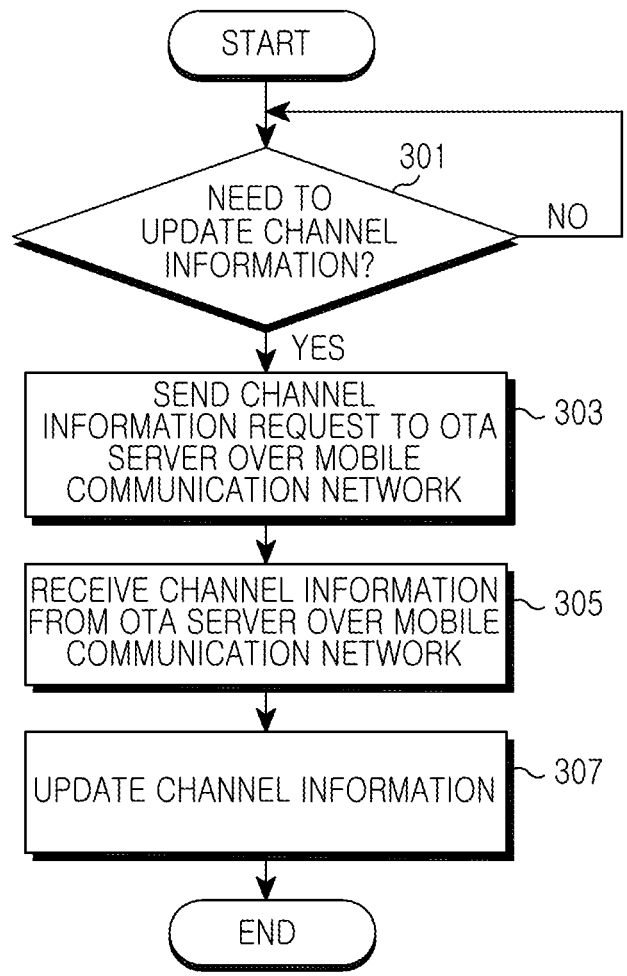
FIG. 3 illustrates a method for updating channel information over a mobile communication network, rather than over a DMB network, in a DMB reception terminal according to an exemplary embodiment of the present invention.

FIG. 3 illustrates a method for updating the channel information over the mobile communication network, rather than over the DMB network, in a DMB reception terminal according to an exemplary embodiment of the present invention.

In step 301, the DMB reception terminal determines whether it is necessary to update the channel information (i.e., the center frequency information of the channel). In an exemplary embodiment, the DMB reception terminal may periodically determine whether it is necessary to update the channel information when a timer for updating the channel information expires. Alternatively, when the user inputs his/her desired channel to view but the channel cannot be received due to a weak signal, the DMB reception terminal may then determine that it is necessary to update the channel information.

When it determines to update the channel information in step 301, the DMB reception terminal then sends a channel information request to the OTA server over the mobile communication network in step 303. That is, the DMB reception terminal sends a request for the channel information corresponding to a specific channel or the whole set of channels input from the user, to the OTA server over the mobile communication network. Herein, the channel information request sent to the OTA server by the DMB reception terminal is for channel information mapped to the location of the DMB reception terminal. For example, in association with a location server (not shown), the OTA server may obtain location information of the DMB reception terminal from the location server and provide the channel information mapped to the corresponding location to the DMB reception terminal over the mobile communication network. Alternatively, the DMB reception terminal may acquire location information based on GPS data received from a GPS satellite through a GPS receiver, and send a channel information request corresponding to the location information to the OTA server by sending the acquired location information to the OTA server. The OTA server may provide the DMB reception terminal with the channel information, mapped to the corresponding location, over the mobile communication network.

Next, the DMB reception terminal receives the channel information from the OTA server over the mobile communication network in step 305.

In step 307, the DMB reception terminal updates stored channel information based on the received channel information. More specifically, the DMB reception terminal updates a stored center frequency for the channels serviced in the previous region with a center frequency for the channels serviced in the current region. The updated channel information may be displayed in the display unit according to a channel information list request of the user so that the user may select and view his/her intended channel. Since the DMB reception terminal searches for only the center frequency of the user's intended channel among the nearby frequencies, the time taken to scan the channels may thereby be reduced.

Next, the DMB reception terminal finishes this process.

Figure 4:
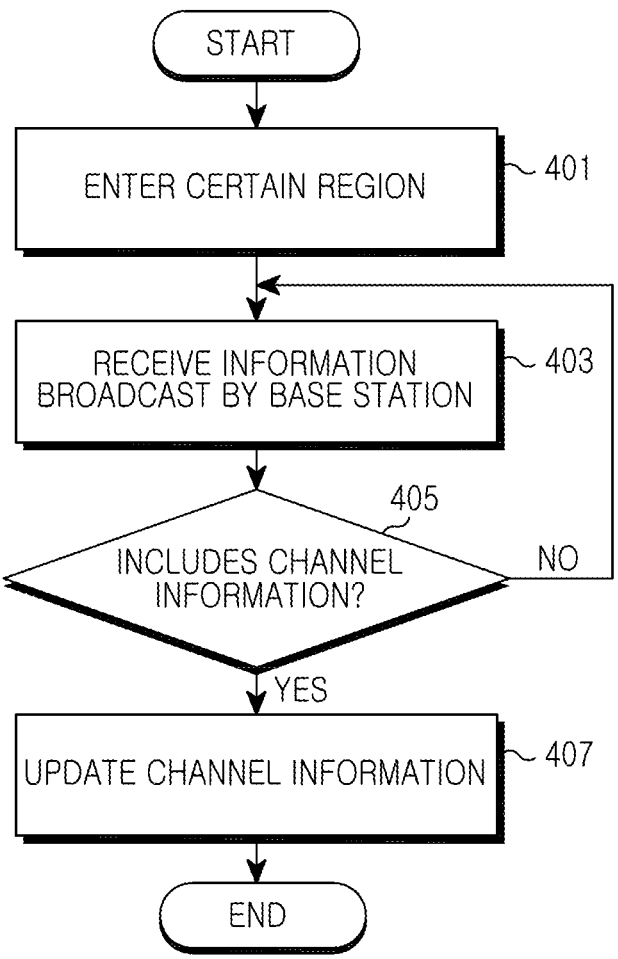
FIG. 4 illustrates a method for updating the channel information over the mobile communication network, rather than over the DMB network, in a DMB reception terminal according to another exemplary embodiment of the present invention.

FIG. 4 illustrates a method for updating channel information over a mobile communication network, rather than over a DMB network, in a DMB reception terminal according to an exemplary embodiment of the present invention.

Referring to FIG. 4, the DMB reception terminal enters a particular region (e.g., a shadow area) in step 401, and receives information broadcast by a base station in the corresponding region in step 403.

In step 405, the DMB reception terminal determines whether the received broadcast information includes channel information. Herein, the base station in the particular region (e.g., the shadow area) may broadcast the channel information so that the DMB reception terminal serviced by a specific broadcasting provider may receive the channel information.

When the received broadcast information includes the channel information in step 405, the DMB reception terminal updates stored channel information based on this channel information in step 407. More specifically, the DMB reception terminal updates a stored center frequency for the channels serviced in the previous region with a center frequency for the channels serviced in the current region. The updated channel information may be displayed in the display unit according to a channel information list request of the user so that the user may select and view his/her intended channel. Since the DMB reception terminal searches for only the center frequency of the user's intended channel among the nearby frequencies, the time taken to scan the channels may thereby be shortened.

By contrast, when the received broadcast information does not include the channel information in step 405, the DMB reception terminal goes back to step 403 and repeats the subsequent step.

Next, the DMB reception terminal finishes this process.

As set forth above, the mobile communication terminal supporting the DMB reception updates the channel information over a mobile communication network rather than over a DMB network, immediately obtains a center frequency for channels serviced in the corresponding region, and searches for only the center frequency of the user's intended channel among the nearby frequencies. Therefore, the time taken to scan the channels may be shortened and the user's convenience may be enhanced. In contrast, when a channel is scanned according to the conventional method, the intended channel is sometimes not detected because of a weak signal and thus every channel must be examined using the channel search function. In such a case, the user's cumbersome search for his/her intended channel may be alleviated by the present invention.

While the invention has been shown and described with reference to certain exemplary embodiments thereof, it will be understood by those skilled in the art that various changes in form and details may be made therein without departing from the spirit and scope of the present invention as defined by the appended claims and the equivalents.

What is claimed is:

1. A method for updating broadcasting information in a mobile communication terminal supporting Digital Multimedia Broadcasting (DMB) reception, the method comprising:

automatically determining, by the terminal, whether it is necessary to update stored broadcasting information based on a timer for updating a channel information or a signal strength of a channel, the stored broadcasting information comprising at least one of frequency information of a channel carrying at least one broadcast program and broadcast program information of the at least one broadcast program;

if it is determined that it is necessary to update the stored broadcasting information, automatically sending, by the terminal, a broadcasting information request to an Over The Air (OTA) server over a mobile communication network;

receiving, by the terminal, broadcasting information from the OTA server over the mobile communication network in response to the request; and updating the stored broadcasting information based on the received broadcasting information, wherein the determining of whether it is necessary to update the stored broadcasting information comprises determining whether it is necessary to update the channel information when the timer for updating the channel information expires.

2. The method of claim 1, wherein the frequency information of the channel varies according to geographic location and comprises center frequency information of a local broadcast of the channel.

3. The method of claim 1, wherein the broadcasting information received from the OTA server comprises broadcasting information mapped to a geographic location of the terminal.

4. The method of claim 3, wherein the location is determined in accordance with a location server.

5. The method of claim 3, wherein the location is determined in accordance with a Global Positioning System (GPS) receiver.

6. The method of claim 1, wherein the determining of whether it is necessary to update the stored broadcasting information comprises receiving, by the terminal, the channel selection input by a user when the signal strength of the input channel is less than a threshold level.

7. An apparatus for updating broadcasting information in a mobile communication terminal supporting Digital Multimedia Broadcasting (DMB) reception, the apparatus comprising:

a controller for automatically determining whether it is necessary to update stored broadcasting information based on a timer for updating a channel information or a signal strength of a channel, the stored broadcasting information comprising at least one of frequency information of a channel carrying at least one broadcast program and broadcast program information of the at least one broadcast program;

a wireless communication unit for, when the controller determines it is necessary to update the stored broadcasting information, automatically sending a broadcasting information request to an Over The Air (OTA) server over a mobile communication network, and for receiving broadcasting information from the OTA server over the mobile communication network in response to the request; and a storage unit for updating the stored broadcasting information based on the received broadcasting information, wherein the determining of whether it is necessary to update the stored broadcasting information comprises determining whether it is necessary to update the channel information when the timer for updating the channel information expires.

8. The apparatus of claim 7, wherein the frequency information of the channel varies according to geographic location and comprises center frequency information of a local broadcast of the channel.

9. The apparatus of claim 7, wherein the broadcasting information received from the OTA server comprises broadcasting information mapped to a geographic location of the terminal 10. The apparatus of claim 9, wherein the location is determined in accordance with a location server.

11. The apparatus of claim 9, wherein the location is determined in accordance with a Global Positioning System (GPS) receiver.

12. The apparatus of claim 7, wherein the determining of whether it is necessary to update the stored broadcasting information comprises receiving, by the terminal, the channel selection input by a user when the signal strength of the input channel is less than a threshold level.

\* \* \* \* \*